United States Patent
Paulraj et al.

(10) Patent No.: US 11,416,051 B2
(45) Date of Patent: Aug. 16, 2022

(54) SYSTEM AND METHOD FOR DYNAMIC REMOTE POWER MANAGEMENT OF INFORMATION HANDLING SYSTEMS

(71) Applicant: DELL PRODUCTS, LP, Round Rock, TX (US)

(72) Inventors: Deepaganesh Paulraj, Bangalore (IN); Vinod Parackal Saby, Bangalore (IN); Ankit Singh, Bangalore (IN); Robin Mathew, Thiruvalla (IN)

(73) Assignee: Dell Products L.P., Round Rock, TX (US)

( * ) Notice: Subject to any disclaimer, the term of this patent is extended or adjusted under 35 U.S.C. 154(b) by 200 days.

(21) Appl. No.: 16/704,319

(22) Filed: Dec. 5, 2019

(65) Prior Publication Data

US 2021/0173458 A1    Jun. 10, 2021

(51) Int. Cl.
| | |
|---|---|
| G06F 1/26 | (2006.01) |
| G06F 1/28 | (2006.01) |
| G06F 9/44 | (2018.01) |
| H04L 12/12 | (2006.01) |
| G06F 9/4401 | (2018.01) |

(52) U.S. Cl.
CPC .............. *G06F 1/26* (2013.01); *G06F 1/28* (2013.01); *G06F 9/442* (2013.01); *H04L 12/12* (2013.01)

(58) Field of Classification Search
None
See application file for complete search history.

(56) References Cited

U.S. PATENT DOCUMENTS

| | | | | |
|---|---|---|---|---|
| 5,802,305 | A | * | 9/1998 | McKaughan ......... G06F 1/3209 709/227 |
| 5,809,313 | A | * | 9/1998 | Gianni ................... H04L 29/06 713/310 |
| 7,757,105 | B2 | * | 7/2010 | Okazaki ............... G06F 1/3209 713/300 |
| 8,335,913 | B2 | | 12/2012 | Mendelow et al. |
| 8,601,252 | B2 | | 12/2013 | Mendelow et al. |
| 9,940,143 | B2 | * | 4/2018 | Kumar .................. G06F 9/4416 |
| 10,104,801 | B2 | | 10/2018 | Bailey et al. |
| 2001/0005894 | A1 | * | 6/2001 | Fukui ........................ G06F 1/26 713/310 |
| 2004/0064743 | A1 | * | 4/2004 | Bolian ....................... G06F 1/26 713/300 |
| 2004/0268111 | A1 | * | 12/2004 | Dayan ..................... H04L 12/12 713/2 |
| 2005/0114719 | A1 | | 5/2005 | Stedman et al. |
| 2007/0162620 | A1 | | 7/2007 | Terry et al. |
| 2012/0131361 | A1 | * | 5/2012 | Chang ..................... H04L 12/12 713/310 |
| 2014/0173093 | A1 | * | 6/2014 | Rabeela .............. H04L 61/2038 709/224 |
| 2015/0074323 | A1 | * | 3/2015 | Chumbalkar ........... G06F 13/40 710/316 |
| 2017/0155573 | A1 | * | 6/2017 | Khemani ................ H04L 25/00 |

(Continued)

*Primary Examiner* — Tanh Q Nguyen
(74) *Attorney, Agent, or Firm* — Larson Newman, LLP (57) ABSTRACT

A service module may detect a power shutdown of an information handling system. In response a service processor may monitor incoming network traffic at a network port and at a universal serial bus port, and if the incoming network traffic includes a power control command directed to the information handling system, then execute the power control command.

18 Claims, 4 Drawing Sheets

(56) References Cited

U.S. PATENT DOCUMENTS

2017/0315954 A1* 11/2017 Chung .................... G06F 21/85
2018/0322012 A1* 11/2018 Sharma ............... G06F 11/1451
2021/0173458 A1* 6/2021 Paulraj ...................... G06F 1/26

* cited by examiner

SYSTEM AND METHOD FOR DYNAMIC REMOTE POWER MANAGEMENT OF INFORMATION HANDLING SYSTEMS

FIELD OF THE DISCLOSURE

The present disclosure generally relates to information handling systems, and more particularly relates to dynamic remote power management of information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A service module may detect a power shutdown of an information handling system. In response a service processor may monitor incoming network traffic at a network port and at a universal serial bus port, and if the incoming network traffic includes a power control command directed to the information handling system, then execute the power control command.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
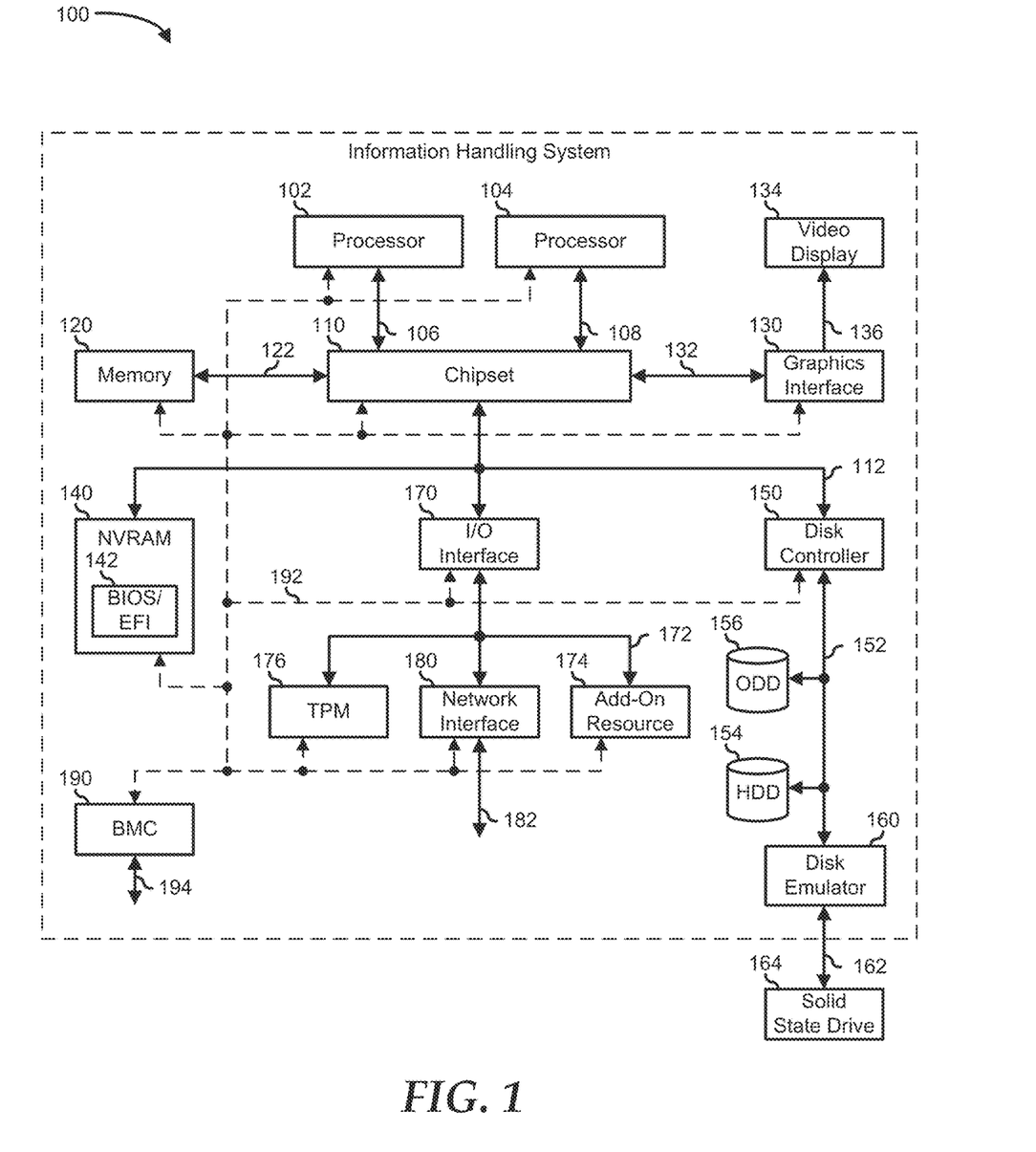
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Providing power management to an information handling system is important to prevent loss of data and to maintain system reliability. During operation of information handling system, events can occur that interrupt or reduce the amount of incoming alternating current (AC) power to the information handling system. In addition, events can also render the information handling system unresponsive. Currently, a service processor can perform power management functions such that the service processor may be configured to receive power control commands for example commands to enable power activation and power deactivation of the information handling systems via a network interface device. Thus, power can be restored to the information handling system after a power shutdown. A power reset can also be performed to the unresponsive information handling system. However, when the information handling system is shut down or unresponsive and the network interface device is not configured, misconfigured, or an internet protocol (IP) address of the service processor is not known, a remote management system would not be able to reach the service processor. In addition, because the information handling system is shut down, a keyboard, video monitor, and mouse (KVM) input/output device would not be able to connect to the information handling system also. Typically, when the above scenario happens someone is required to physically turn on the information handling system which may be difficult if the power shutdown happened at odd hours or the information handling system is located in a remote data center thousands of miles away. Thus, there is a need to be able to remotely manage the power of information handling systems even when the information handling system is shut down or unresponsive and the service processor of the information handling system cannot be reached.

Figure 2:
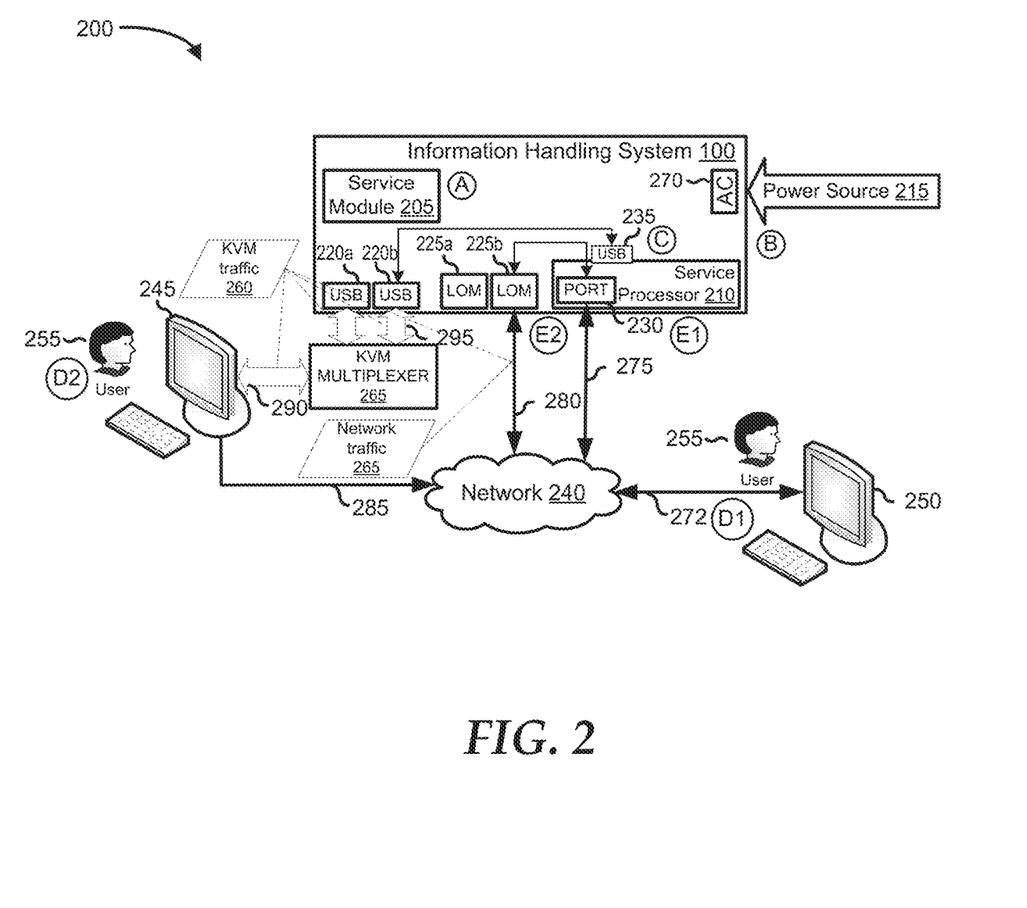
FIG. 2 is a block diagram illustrating an example of a system for dynamic remote power management of information handling systems, according to an embodiment of the present disclosure.

FIG. 2 illustrates a system 200 for dynamic remote power management of information handling systems even when the service processor cannot be reached and/or the information handling system is shut down or unresponsive. System 200 includes information handling system 100, a remote administration station 250, and a KVM station 245. Information handling system 100 also referred to herein as a host includes a service module 205 and a service processor 210 that is communicatively coupled to a remote administration station 250 via a network 240 through a management port 230 also referred to herein as a network interface device 230 or simply as a port 230. Management port 230 is a dedicated port for service processor 210. In addition, information handling system 100 includes network interface devices 225a-225b which may include NICs and/or local-area networks (LANs) on motherboard (LOMs). Information handling system 100 also includes USB ports 220a-220b which is connected to a KVM multiplexer 265 that is communicatively coupled to KVM station 245. KVM station 245 is also communicatively coupled to information handling system 100 through network interface device 225b or simply LOM 225b via network 240. Information handling system 100 may be powered from a power source 215 having AC or direct current (DC) output voltages via AC input 270.

A remote user 255 can be a user or an administrator that may utilize KVM station 245 and/or remote administration station 250. Remote user 255 can be a remote iDRAC user that connects to remote administration station 250 to control and configure servers such as information handling system 100 via network connections 272 and 275. Remote user 255 can also be a remote KVM user that utilizes KVM station 245 to logon or connect to information handling system 100 to control and configure the servers like information handling system 100 via network connections 280 and 285 and/or communication channels 290 and 295.

KVM station 245 allows remote user 255 to access information handling system 100 over network 240 also referred to KVM/IP. KVM station 245 also allows remote user 255 to access information handling system 100 via a KVM switch also referred to as a KVM multiplexer 265. KVM station 245 may support physical selection mechanisms, logical selection mechanisms, or both, for remote user 255 to link I/O devices in KVM station 245 to a selected information handling system such as information handling system 100. KVM multiplexer 265 allows more than one KVM station to share access to information handling system 100. In addition, the KVM multiplexer 265 may be configured to take a user input from one or more I/O devices in KVM station 245 and send it to multiple information handling systems. The user input may be referred to as a control command or a switch command, and the user input may be received, for example, as a result of physical manipulation of an I/O device in KVM station 245 by remote user 255. KVM multiplexer 265 transmits the user input also referred to as KVM traffic to the information handling system 100 via USB ports 220a-220b and/or LOM 225b as digital or network traffic. USB ports 220a-220b may be standard cable connection interfaces that allow USB devices to be connected to each other and transfer the digital traffic over USB cables.

Remote administration station 250 allows remote user 255 to access service processor 210 through management port 230 to remotely monitor and manage information handling system 100 via network 240. Service processor 210 may include any system, device, or apparatus configured to permit an administrator such as remote user 255 to remotely monitor and/or remotely manage information handling system 100 through a GUI or command-line interface (CLI) at remote administration station 250.

Service processor 210 may be, may include or be a part of an access controller, a BMC, a Dell remote access controller (DRAC), or an iDRAC. Service processor 210 may be an interface card and can have a processor, a memory, a battery, and a network connection. Service processor 210 can provide different functions such as power management, virtual media access, and remote console capabilities to remote user 255. Service processor 210 may provide remote monitoring and management regardless of whether the information handling system 100 is powered on or off via management port 230 which may be configured as a default port to listen for connections. For example, service processor 210 may be configured to listen to port number 22 for secure shell (SSH) connections, to port number 23 for telnet connections, to port number 80 for hypertext transfer protocol (HTTP) connections, to port 443 for HTTP secure (HTTPS) connections, to port 161 for simple network management protocol (SNMP) connections, etc.

The service processor 210 can operate in accordance with an intelligent platform management interface (IPMI) specification, a web services management (WSMAN) standard, or another interface standard. The skilled artisan will recognize that management controllers can include other circuit elements, devices, or sub-systems, such as an embedded controller, a logic device such as a programmable array logic (PAL) device, a complex programmable logic device (CPLD), a field-programmable gate array (FPGA) device or the like, multiplexors, and other devices as needed or desired to provide the functions and features as described herein. CPLD may act as a controller for powering up and powering down information handling system 100.

Management port 230 may include any suitable system, apparatus, or device operable to serve as an interface between service processor 210 and remote administration station 250. Management port 230 may enable information handling system 100 to communicate with remote administration station 250 using any suitable transmission protocol such as the transmission control protocol/internet protocol (TCP/IP) and/or standard such as an IEEE 802.11 standard or wireless transmissions such as the WiFi® family of radio technologies. In the same or alternative embodiments, management port 230 may provide physical access to a networking medium and/or provide a low-level addressing system such as through the use of media access control (MAC) addresses.

However, a network connection between service processor 210 to network 240 via management port 230 such as network connection 275 may be misconfigured or not configured at all. In addition, even if network connection 275 has been configured correctly, an IP address of service processor 210 may not be known by remote user 255. Further, information handling system 100 may be located in an unmanned remote data center, where the ability to communicate with information handling system 100 even if it is powered down becomes crucial. Without the current disclosure, a service engineer may be required to visit the data center, find information handling system 100 and physically press the power button to turn it on. This is costly and time-consuming.

Service module 205 may be a lightweight software service or software agent that can run in information handling system 100 such as an iDRAC service module (iSM). Service module 205 may complement service processor interfaces such as a GUI, RACADM CLI, Redfish, and web service management (WSMAN) with additional monitoring data. Service module 205 may include any system, device or apparatus configured to monitor system power status, system power states, and/or system power management events of information handling system 100. In some embodiments, service module 205 may be implemented as a program of instructions that may be read from memory by a processor. Service module 205 may monitor information handling system 100 in various ways. For example, service module 205 may determine whether the advanced configuration and power interface (ACPI) and/or BIOS is performing a power shutdown. The service module 205 may also detect that there is no power in power interface 130. Service module 205 may also detect whether information handling system 100 is unresponsive.

Service processor 210 may be assigned a static IP address for the connection over the USB and similarly service module 205 may also be assigned a static IP address for the same connection. This connection is used by service module 205 to communicate with service processor 210 to transmit operating system (OS) logs and/or information regarding the information handling system such as the IP addresses associated with the information handling system 100.

Service processor 210 may have a USB physical connectivity with information handling system 100 as depicted by USB 235. In addition, service processor 210 may have connectivity with one or more network adapters of the information handling system. Service processor may select any one of the network adapters such as a LOM and/or a network daughter card (NDC) that it has connectivity with to redirect management frames such as power control commands detected in KVM and/or network traffic.

Service module 205 may be configured to provide service processor 210 with a notification upon detection of the power shutdown and/or unresponsiveness of information handling system 100. The notification may include other information such as network information associated with address and protocol or standard used by KVM traffic and/or network traffic to information handling system 100. For example, service module 205 may include information regarding USB port 220*b* and LOM 225*b*. In addition, service module 205 may be configured to provide the network information to service processor 210 when it starts monitoring information handling system 100 or sometime thereafter such as IP addresses associated with information handling system 100.

After receiving the notification that information handling system 100 is powered down or unresponsive, service processor 210 may be configured to automatically listen to inbound network traffic such as management packets at one or more network interface devices such as at LOM 225*b* and/or USB port 220*b*. In another embodiment, service processor 210 may be configured to monitor information handling system 100 and detect whether information handling system 100 is powered down and upon determining that information handling system 100 is powered down take control of one or more network interface devices such as LOM 225*b* and USB port 220*b* and listen for network traffic.

For example, service processor 210 may listen for KVM traffic in USB port 220*b* for a power control command such as Ctrl+Alt+Del which may be used to power on the information handling system 100. In another example, service processor 210 may listen for management packets associated with information handling system 100 at LOM 225*b*. In particular, service processor 210 may listen for a power control command to initiate start up of information handling system 100. Service processor 210 may also be configured to listen to power control commands such as a power reset or a power cycle command. Service processor 210 may execute the power control command. In another embodiment, service processor 210 may determine whether information handling system 100 is powered down and if so proceed to power up information handling system 100 prior to executing the command.

Because service processor 210 is configured to monitor KVM traffic and/or network traffic from remote administration station 250 or KVM station 245 for power management functions even if service processor 210 is unreachable via management port 230 and information handling system 100 is powered down or unresponsive, service processor 210 may be able to take control and execute the requested power management function against information handling system 100 and restore information handling system 100 to an operational state.

FIG. 2 is annotated with a series of letters A-D1/D2-E1/E2. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, service module 205 monitors information handling system 100 to detect when information handling system 100 is powered down or unresponsive. Service module 205 may also provide information regarding information handling system 100 such as IP addresses associated with information handling system and/or its MAC address.

At stage B, service module 205 detects a power shutdown of information handling system 100 via a power shut down signal from ACPI or CPLD. After detecting the power shutdown of information handling system 100, service module 205 may transmit a notification of the power shutdown to service processor 210.

At stage C, in response to receiving the notification of the power shut down of information handling system 100, service processor 210 may switch a shared network or a LOM multiplexer to start listening to a shared network interface or port such as a shared LOM and/or shared USB port of information handling system 100 for network traffic and/or KVM traffic accordingly. Because service processor 210 is logically separate from information handling system 100 and powered on even if the information handling system 100 is powered off, service processor 210 can monitor network traffic and/or KVM traffic from the selected network interface and/or USB port.

At stage D1, remote user 255 at remote administration station 250 performs power control actions to the information handling system 100 to initiate a startup of information handling system 100 by sending a power control command. The power control command includes a destination IP address that matches the IP address of the information handling system 100. Because service processor 210 is listening to LOM 225*b* and monitoring the network input requests, service processor 210 may detect the power control command from remote administration station 250 and/or determine the destination IP address by parsing or decoding the network traffic and/or power control command. After detecting the power control command and determining that the power control command is directed to information handling system 100, service processor 210 takes control and executes the power control command or the action requested of remote user 255 with the CPLD and initiates the start-up process for information handling system 100. The power control command may refer to various commands for power management such as to startup an information handling system via various protocols and application programming interfaces. An example of a power control command may include "racadm-r 10.94.192.168-u root-p xxxxx serveraction powerup" where "10.94.192.168" is an IP address of information handling system 100 as shown in a table below.

In another embodiment, at stage D2, remote user 255 at KVM station 245 performs a power control action directed to the information handling system 100 by logging into a KVM jump box also referred to as KVM station 245 and sending a power control command via USB ports 220a-220b of information handling system 100. For example, remote user 255 may activate a pre-configured hotkey for powering on information handling system 100. In another example, remote user 255 may use the key combination Ctrl+Alt+Del as a power-on signal for information handling system 100. Because service processor 210 is listening to USB port 220b and monitoring the USB input traffic, service processor 210 may be able to detect incoming KVM traffic and the power control command from KVM station 245 via communication channels 290 and 295. The power control commands may also be sent to information handling system 100 via network 240 and LOM 225b using connections 280 and 285. Because service processor 210 is listening to USB port 220b and monitoring the USB input traffic service processor 210 may be able to detect the KVM traffic the power control command from KVM station 245 and destination address by parsing and/or decoding the KVM traffic and/or power control command.

At stage E1, after detecting the power control command from remote administration station 250 and determining that the power control command is directed to information handling system 100, service processor 210 takes control and executes the power control action requested in the power control command with the CPLD. At stage E2, after detecting the power control command from KVM station 245 and determining that the power control command is directed to information handling system 100, service processor 210 takes control and executes the power control action requested in the power control command with the CPLD.

In another embodiment, prior to executing the power control command to initiate a power start-up of information handling system 100, service processor 210 may determine whether BIOS/EFI module 142 is operational and/or responsive. If service processor 210 determines that BIOS/EFI module 142 is operational and/or responsive, then service processor 210 may execute the power control command to initiate a power startup of information handling system 100. If service processor 210 determines that BIOS/EFI module 142 is operational, then service processor 210 may initiate a power restart of information handling system 100.

In yet another embodiment, service processor 210 starts listening to all network ports and/or USB ports of information handling system instead of switching to listen to one network port and/or one USB port. Once the power control command is received through any of the network ports and/or USB ports which may also be referred to as communication channels, service processor 210 executes the power control command with the CPLD. The service processor may have a mapping table similar to below that it uses to identify relevant requests and/or commands to the information handling system.

| USB Address | Host OS IP Address | Host MAC Address | Service Processor IP Address |
|---|---|---|---|
| 0xFFFF | 10.94.196.23 | 00-14-22-01-23-45 | 10.94.192.168 |
| 0x041E | 1094.196.58 | 11-32-27-01-24-58 | 10.94.192.87 |

Shown in FIG. 2 is one information handling system communicatively coupled to one KVM station and one remote administration station for simplicity. Typically, network 240 may be communicatively coupled to a plurality of information handling systems, KVM stations and remote administration stations that manage the information handling systems.

Figure 3:
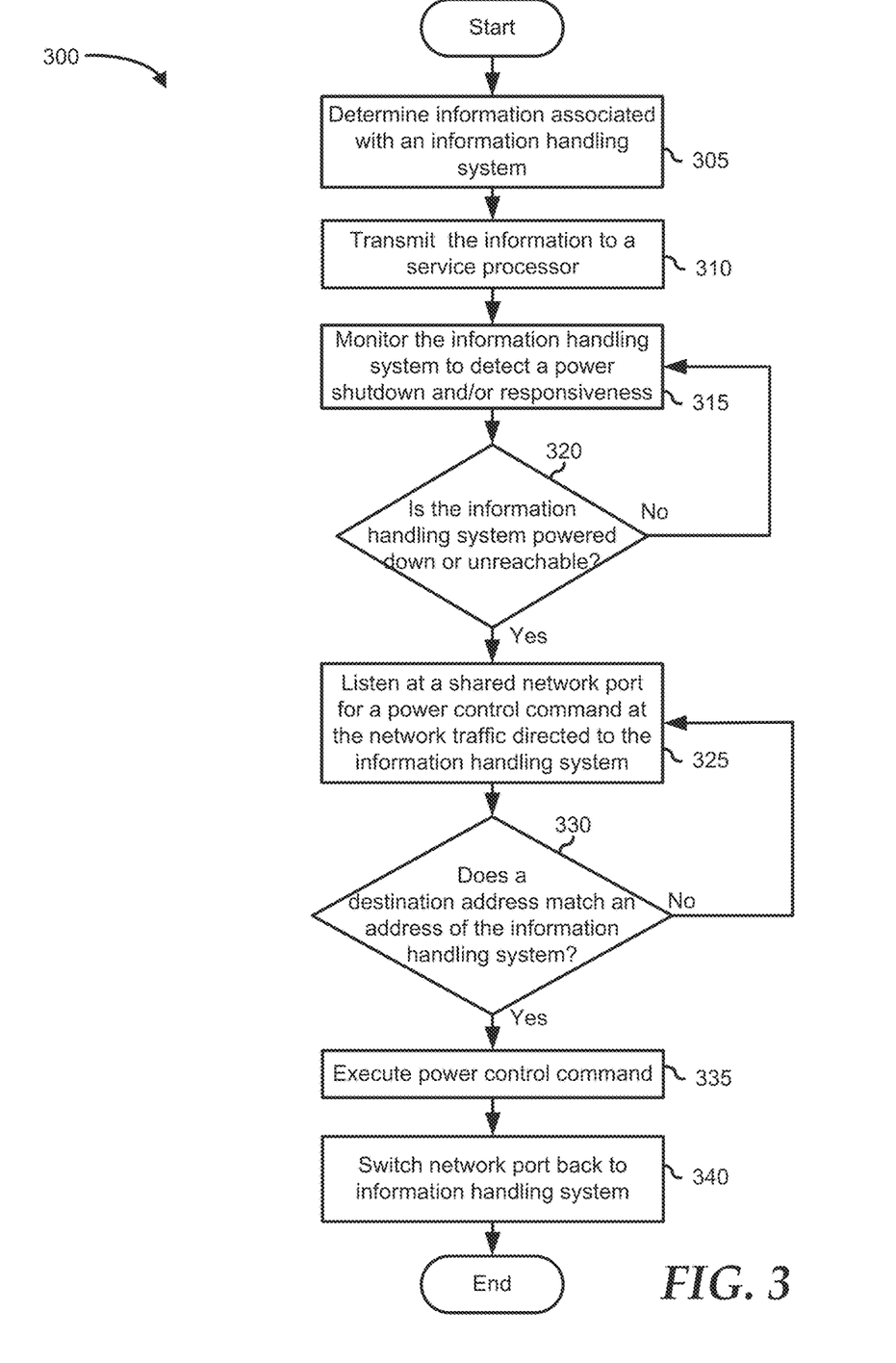
FIG. 3 is a flowchart illustrating an example of a method for dynamic remote power management of information handling systems via a network port, according to an embodiment of the present disclosure.

FIG. 3 illustrates a method 300 for dynamically performing remote power management of information handling systems. The method 300 may be performed by one or more components of FIG. 2. In particular, blocks 305, 310, 315, and 320 may be performed by a service module and blocks 325, 330, 335, and 340 may be performed by a service processor.

Method 300 typically starts at block 305 where the method may determine information associated with an information handling system. The method may determine the IP and/or MAC addresses used to communicate with the information handling system. For example, the method may determine a USB address, a host OS IP address, a host MAC address, and a service processor IP address.

The method proceeds to block 310 where the method transmits the determined information to a service processor. The method may also provide other information such as an OS name, an OS version, and a fully qualified domain name (FQDN) of the information handling system to the service processor. For example, an iSM may use the "OS to iDRAC pass-through over USBNIC" feature to establish communication with the iDRAC and transmit the information.

The method proceeds to block 315 where the method monitors the information handling system and determines whether the information handling system is powered down or is unreachable at decision block 320. The information handling system may be powered down accidentally due to power failure for example. Typically, the information handling system may be powered back up from a remote administration station if a management port of service processor is configured and the service processor is reachable. However, there are instances that the network port of the service processor is misconfigured or the IP address of the service processor is unknown. If the management port of the service processor is misconfigured or the IP address of the service processor is unknown, then the remote administration station cannot connect to or reach the service processor via the network. If the information handling system is powered down or is unreachable, then the "YES" branch of decision block 320 is taken and the method proceeds to block 325. If the information handling system is not powered down or is reachable, then the "NO" branch of decision block 320 is taken and the method proceeds to block 315.

At block 320, the method may leverage a NIC or a LOM of the information handling system as a communication channel between the service processor and the remote administration station. For example, the service processor may switch a network multiplexer/switch or network controller to divert the shared LOM network traffic to it to start listening to the network traffic. By taking control and utilizing the NIC or the LOM as the communication channel, a remote user may be able to access the service processor and power up an otherwise unreachable information handling system without physical intervention.

At block 325, the service processor may proceed to listen to the network traffic for management streams directed to the information handling system. The method may direct the communication channel to filter the network traffic based on the destination IP address and/or the destination MAC address of the information handling system and proceed to decision block 330 where the method determines if the destination IP address or the destination MAC address matches one of the IP addresses or the MAC address of the information handling system accordingly and then the method may forward the network traffic to the service processor. Otherwise, the method forwards the network traffic to the information handling system. In another embodiment, the service processor may also filter for power control commands in addition to the destination IP address and/or the destination MAC address.

If the destination IP address matches the IP address of the information handling system, then the "YES" branch of decision block 330 is taken and the method proceeds to block 335. If the destination IP address does not match the IP address of the information handling system, then the "NO" branch of decision block 330 is taken and the method proceeds to block 325 to continue listening to the network traffic. Similarly, if the destination MAC address matches the MAC address of the information handling system, then the "YES" branch of decision block 330 is taken and the method proceeds to block 335. If the destination MAC address does not match the MAC address of the information handling system, then the "NO" branch of decision block 330 is taken and the method proceeds to block 325 to continue listening to the network traffic.

At block 335, the method determines whether the network traffic includes a power control request or command. If the network traffic includes a power control command, the service processor then decodes or parses the power control command. For example, the service processor may determine an action to be taken at the destination IP address or destination MAC address and proceeds to execute the action. After executing the action, the method proceeds to block 340 where the method switches the multiplexer to divert the shared NIC or LOM network traffic and control back to the information handling system where the information handling system continues to use the shared NIC or LOM for its operations then the method ends. In another embodiment, after switching the control of the shared NIC or LOM back to the information handling system, the method continues to monitor the information handling system for a next power shutdown or unresponsiveness.

Figure 4:
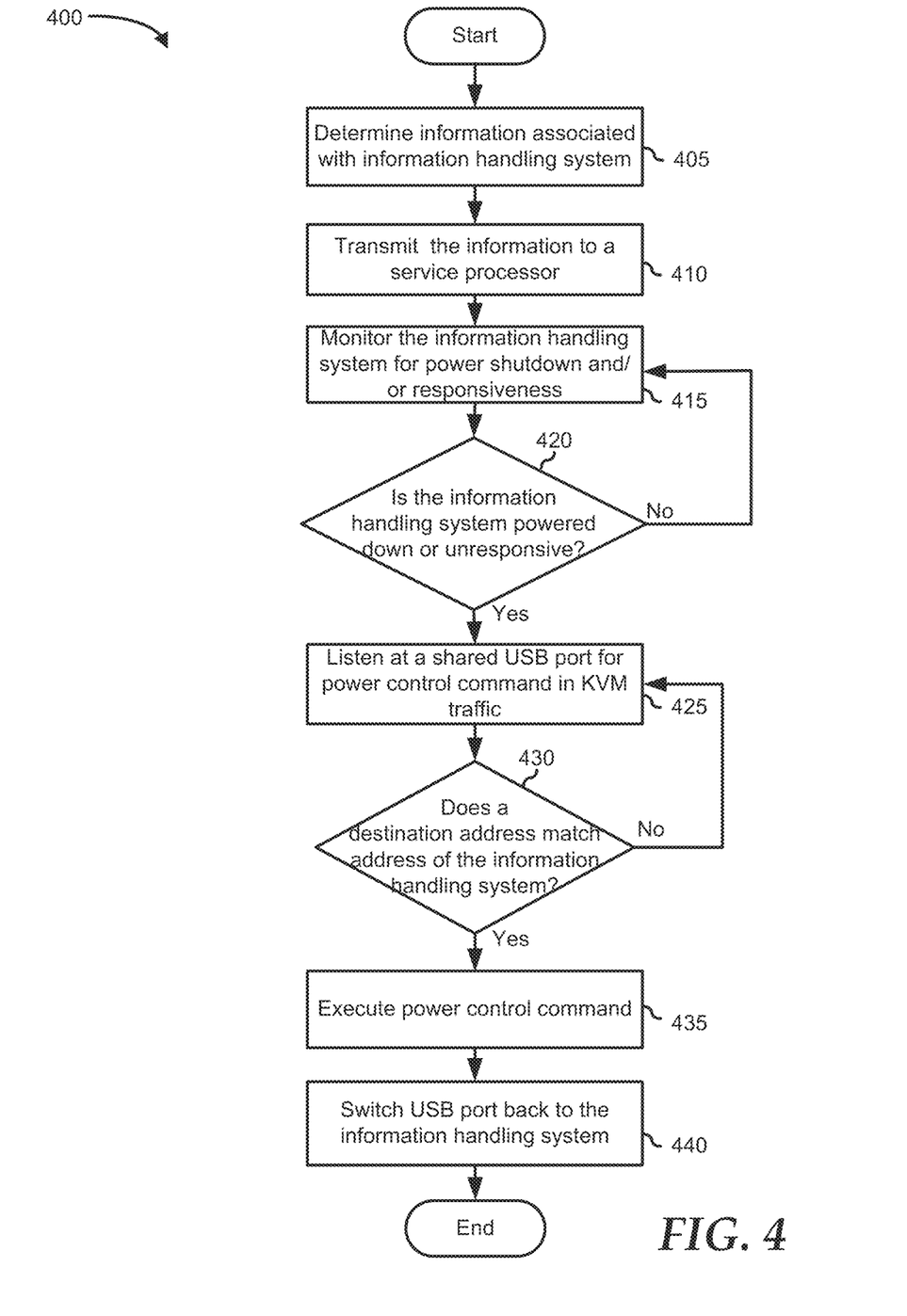
FIG. 4 is a flowchart illustrating an example of a method for dynamic remote power management of information handling systems via a universal serial bus port, according to an embodiment of the present disclosure.

FIG. 4 illustrates a method 400 for dynamically performing remote power management of information handling systems. The method 400 may be performed by one or more components of FIG. 2. In particular, blocks 405, 410, 415, and 420 may be performed by a service module and blocks 425, 430, 435, and 440 may be performed by a service processor.

The method 400 typically starts at block 405 where the method may determine information associated with the information handling system. For example, the method determines IP and/or MAC addresses used to communicate to the information handling system similar to block 305 of method 300. For example, a KVM station also referred to as a KVM jump box may use an IP address to connect to the information handling system via a USB port. The KVM jump box may use a different IP address to connect to the information handling system via a network. The method may determine both the IP address and transmit them to the information handling system.

The method proceeds to block 410 where the method provides the determined information to the service processor similar to block 310 of FIG. 3. The method then proceeds to block 415 where the method monitors the information handling system to detect whether the information handling system is powered down or unresponsive at decision block 420. If the information handling system is powered down or unresponsive, then the "YES" branch of decision block 420 is taken and the method proceeds to block 425. If the information handling system is powered up or responsive, then the "NO" branch of decision block 420 is taken and the method proceeds to block 415 where it continues monitoring the information handling system.

At block 425, the method may leverage a USB port used by a remote KVM console as a communication channel to the information handling system. The method may switch a multiplexer to divert the KVM traffic to the service processor. By taking control of the USB port, the service processor may listen to the incoming KVM traffic for power control requests or commands directed to the information handling system similar to decision block 330 of FIG. 3 to determine whether the KVM traffic is directed to the information handling system by determining whether a destination address in the KVM traffic matches one of the IP addresses and/or MAC address of the information handling system at decision block 430. In addition the method may also leverage a network interface device to listen for KVM traffic directed to the information handling system. Finally, the method may also filter the incoming KVM traffic for power control commands.

If the destination IP address or the destination MAC address of the KVM traffic matches the IP address or the MAC address of the information handling system, then the "YES" branch of decision block 430 is taken and the method proceeds to block 435. If the destination IP address or the destination MAC address of the KVM traffic does not match the IP address or the MAC address of the information handling system, then the "NO" branch of decision block 430 and the method proceeds to block 425.

At block 435, the method determines the power control command in the KVM traffic and executes the power control command similar to block 335 of FIG. 3. After executing the power control request or command directed to the information handling system, the method switches the USB port and/or the network interface device back to the information handling system similar to block 340 where the information handling system uses the USB port for its KVM operations. After switching the control of the USB port and/or the network interface device back to the information handling system, the method ends. In another embodiment, after switching the control of the shared USB port and/or the network interface device back to the information handling system, the method continues to monitor the information handling system for a next power shutdown or unresponsiveness.

Although FIG. 3, and FIG. 4 show example blocks of method 300 and method 400 in some implementation, method 300 and method 400 may include additional blocks, fewer blocks, different blocks, or differently arranged blocks than those depicted in FIG. 3 and FIG. 4. Additionally, or alternatively, two or more of the blocks of method 300 and method 400 may be performed in parallel. For example, block 325 of method 300 and block 425 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   monitoring an information handling system to detect whether the information handling system is shut down;
   in response to detecting that the information handling system is shut down, taking control of a shared network port of the information handling system by a service processor and diverting by the service processor, incoming network traffic at the shared network port to the service processor;
   monitoring, by the service processor, the incoming network traffic at the shared network port of the information handling system; and
   if the incoming network traffic includes a power control command and if the power control command is directed to the information handling system, then executing, by the service processor, the power control command.

2. The method of claim 1, wherein the power control command is a command to initiate a startup of the information handling system.

3. The method of claim 1, further comprising subsequent to executing the power control command, switching control of the shared network port back to the information handling system by the service processor.

4. The method of claim 1, further comprising subsequent to executing the power control command, detecting a next shut down of the information handling system.

5. The method of claim 1, further comprising transmitting internet protocol addresses associated with the information handling system to the service processor.

6. The method of claim 1, further comprising the service processor parsing the power control command to determine a destination internet protocol address of the power control command.

7. The method of claim 6, further comprising the service processor determining whether the destination internet protocol address matches one of internet protocol addresses associated with the information handling system.

8. An information handling system, comprising:
   a service module configured to monitor the information handling system to detect a power shutdown of the information handling system and in response to the detection of the power shutdown, to transmit a notification to a service processor; and
   the service processor configured to:
     in response to receipt of the notification, take control of a shared network port of the information handling system and divert incoming network traffic at the shared network port of the information handling system to the service processor;
     monitor the incoming network traffic at the shared network port of the information handling system;
     determine whether the incoming network traffic includes a power control command and whether the power control command is directed to the information handling system; and
     in response to determining that the incoming network traffic includes the power control command that is directed to the information handling system, execute the power control command.

9. The information handling system of claim 8, wherein the power control command is to initiate a startup the information handling system.

10. The information handling system of claim 8, wherein the service module is further configured to monitor the information handling system to detect a next power shutdown of the information handling system subsequent to the execution of the power control command.

11. The information handling system of claim 8, wherein the incoming network traffic is diverted to a port of the service processor.

12. The information handling system of claim 8, wherein the service module is further configured to transmit internet protocol addresses associated with the information handling system to the service processor.

13. A non-transitory computer-readable storage medium to store instructions that are executed by a processor to perform operations comprising:
   detecting whether an information handling system is unresponsive;
   if the information handling system is unresponsive, then taking control of a shared network port of the information handling system by a service processor and diverting, by the service processor, incoming network traffic at the shared network port of the information handling system to the service processor; and
   if the incoming network traffic at the shared network port of the information handling system includes a power control command and if the power control command is directed to the information handling system, then executing, by the service processor, the power control command.

14. The non-transitory computer-readable storage medium of claim 13, the operations further comprising monitoring the information handling system to detect whether the information handling system is unresponsive.

15. The non-transitory computer-readable storage medium of claim 13, wherein the incoming network traffic at the shared network port of the information handling system is diverted to a port of the service processor.

16. The non-transitory computer-readable storage medium of claim 13, the operations further comprising the service processor parsing the power control command to determine a destination internet protocol address of the power control command.

17. The non-transitory computer-readable storage medium of claim 16, the operations further comprising determining whether the destination internet protocol address matches one of internet protocol addresses associated with the information handling system.

18. The non-transitory computer-readable storage medium of claim 13, wherein the power control command is a command to initiate a startup of the information handling system.

* * * * *